United States Patent
Kerr (10) Patent No.: US 7,376,894 B2
(45) Date of Patent: *May 20, 2008

(54) VECTOR PATH MERGING INTO GRADIENT ELEMENTS

(75) Inventor: Clifton E Kerr, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 444 days.

This patent is subject to a terminal disclaimer.

(21) Appl. No.: 10/991,635

(22) Filed: Nov. 18, 2004

(65) Prior Publication Data

US 2006/0103673 A1 May 18, 2006

(51) Int. Cl.
*G06F 17/00* (2006.01)

(52) U.S. Cl. ................................ 715/255; 345/619

(58) Field of Classification Search ............... 715/500, 715/514, 513, 200, 234; 345/619, 16
See application file for complete search history.

(56) References Cited

U.S. PATENT DOCUMENTS

| | | | | |
|---|---|---|---|---|
| 3,617,718 | A * | 11/1971 | Dummermuth | 318/571 |
| 5,198,902 | A * | 3/1993 | Richards et al. | 348/598 |
| 5,376,795 | A * | 12/1994 | Hasegawa et al. | 250/363.04 |
| 5,611,036 | A * | 3/1997 | Berend et al. | 345/441 |
| 5,650,941 | A * | 7/1997 | Coelho et al. | 345/619 |
| 6,047,893 | A * | 4/2000 | Saporetti | 235/462.1 |
| 6,236,402 | B1 * | 5/2001 | Edmark | 345/419 |
| 6,529,206 | B1 * | 3/2003 | Ohki et al. | 345/619 |
| 6,565,609 | B1 * | 5/2003 | Sorge et al. | 715/503 |
| 6,697,081 | B1 * | 2/2004 | Ito | 345/619 |
| 6,847,379 | B2 * | 1/2005 | Grosvenor et al. | 345/619 |
| 7,054,468 | B2 * | 5/2006 | Yang | 382/118 |
| 2003/0028557 | A1 * | 2/2003 | Walker et al. | 707/500 |
| 2003/0076361 | A1 * | 4/2003 | Hatanaka et al. | 345/771 |
| 2004/0205587 | A1 * | 10/2004 | Draper | 715/513 |
| 2005/0013486 | A1 * | 1/2005 | Wiedemann et al. | 382/181 |
| 2005/0190991 | A1 * | 9/2005 | McCleese | 382/294 |
| 2005/0195215 | A1 * | 9/2005 | Wang | 345/619 |
| 2006/0005114 | A1 * | 1/2006 | Williamson et al. | 715/502 |
| 2006/0017814 | A1 * | 1/2006 | Pinto et al. | 348/208.4 |
| 2006/0237652 | A1 * | 10/2006 | Kimchy et al. | 250/363.02 |
| 2007/0113192 | A1 * | 5/2007 | Popp et al. | 715/760 |
| 2007/0113193 | A1 * | 5/2007 | Popp et al. | 715/760 |
| 2007/0192716 | A1 * | 8/2007 | Hamada | 715/764 |

OTHER PUBLICATIONS

Drori et al., Fragment-Based Image Completion, ACM 2003, pp. 303-312.*
Battiato et al., SVG Rendering of Real Images Using Data Dependent Triangulation, ACM 2004, pp. 185-192.*
Haris et al., Hybrid Image Segmentation Using Watersheds and Fast Region Merging, IEEE 1998, pp. 1684-1699.*
Vanhamel et al., Multiscale Gradient Watersheds of Color Images, IEEE 2003, pp. 617-626.*

* cited by examiner

*Primary Examiner*—Cong-Lac Huynh
(74) *Attorney, Agent, or Firm*—Lee & Hayes, PLLC (57) ABSTRACT

In one embodiment, methods and architectures are provided that heuristically analyze an incoming vector path data stream over multiple DDI calls, and merge the path data strips into a single gradient element. This single gradient element can then be processed, as by being serialized into XAML, so that it can be somewhat more efficiently consumed by a consuming device. Merging of the vector path data can eliminate or at least reduce noticeable seams, conserve parsing time and reduce memory consumption.

36 Claims, 8 Drawing Sheets

VECTOR PATH MERGING INTO GRADIENT ELEMENTS

TECHNICAL FIELD

This invention pertains to methods and systems for processing vector path data.

BACKGROUND

"Avalon" is the code name for the presentation subsystem in Microsoft's Longhorn operating system. Avalon provides the foundation for building applications and high fidelity experiences in Longhorn, blending together application UI, documents, and media content, while exploiting the full power of a computer. The Avalon functionality extends to the support for Tablet and other forms of input, a more modern imaging and printing pipeline, accessibility and UI automation infrastructure, data-driven UI and visualization, as well as the integration points for weaving the application experience into the Windows shell.

Avalon enables not only richer control design and development, but it also relies heavily on a vector-based system instead of the more common pixel-based one. Avalon also introduces a new programming model known as XAML (Extensible Application Markup Language) which presents a new way of designing application user interfaces.

To provide flexibilities in this new presentation subsystem, it is desirable to provide support for so-called legacy applications which are pixel-based. Doing so, however, involves reconciling Avalon's processing paradigm with that of the legacy systems.

As an example, consider the following. Sometimes when a legacy application or a device driver interface (DDI) processes a document, it creates primitives that describe objects contained in the document and, because of past software or hardware limitations, those primitives are further processed into less complex (but more numerous) primitives. For example, the graphical component of the Microsoft Windows graphical environment is the graphics device interface or GDI. GDI communicates between the application and the device driver, which performs the hardware-specific functions that generate output. By acting as a buffer between applications and output devices, GDI presents a device-independent view of the world for the application while interacting in a device-dependent format with the device.

In the GDI environment are two working spaces—the logical and the physical. Logical space is inhabited by applications; it is the "ideal" world in which all colors are available, all fonts scale, and output resolution is phenomenal. Physical space, on the other hand, is the real world of devices, with limited color, strange output formats, and differing drawing capabilities. In Windows, an application does not need to understand the quirkiness of a new device. Rather, GDI code works on the new device if the device has a device driver.

GDI concepts mapped between the logical and the physical are objects (pens, brushes, fonts, palettes, and bitmaps), output primitives, and coordinates. For purposes of the present discussion, consider only output primitives which are generated by the application. Output primitives are passed as "logical" requests to the device driver, which draws the primitive to the best of its ability and resolution. If the driver cannot handle a certain primitive—for example, it cannot draw an ellipse—GDI simulates the operation. For an Ellipse call then, GDI calculates a polygon that represents a digitized ellipse. The resulting polygon can then be simulated as a polyline and a series of scanline fills if the device cannot draw polygons itself. The application, though, does not care what system component does the actual work; the primitive gets drawn.

Hence, one of the manifestations of GDI (or GDI+) is that complex primitives (such as the ellipse primitive created by the application) can get processed into many additional primitives that attempt to provide the complex primitive.

In some instances, such as in the case of a gradient, multiple strips of adjoining path vector data with color information will be generated to provide a gradient. In instances where an image is concerned, an image will be sent as a banded physical image through a series of DDI calls.

Because Avalon is pixel-agnostic, so-to-speak, these past or legacy processing approaches, which attempt to break down data with an eye to pixel-efficient processing, create problems in the Avalon system not only from the standpoint of data bloating (creating additional data which is not as efficiently processed in Avalon), but from the standpoint of creating visually-discernable anomalies in the final rendered product. Specifically, in the gradient example which utilizes multiple strips of vector path data, noticeable seams are produced at the strip boundaries. In the case of banded image processing, Avalon's anti-aliasing processing produces noticeable seams when the banded images are rendered.

Accordingly, this invention arose out of concerns associated with providing support for legacy applications in a manner that reduces the occurrences of visually discernable anomalies.

SUMMARY

In one embodiment, methods and architectures are provided that heuristically analyze an incoming vector path data stream over multiple DDI calls, and merge the path data strips into a single gradient element. This single gradient element can then be processed, as by being serialized into XAML, so that it can be somewhat more efficiently consumed by a consuming device. Merging of the vector path data can eliminate noticeable seams, conserve parsing time and reduce memory consumption.

DETAILED DESCRIPTION

Overview

In one embodiment, methods and architectures are provided that heuristically analyze an incoming vector path data stream over multiple DDI calls, and merge the path data strips into a single gradient element. This single gradient element can then be processed, as by being serialized into XAML, so that it can be somewhat more efficiently consumed by a consuming device. Merging of the vector path data can eliminate noticeable seams, conserve parsing time and reduce memory consumption, as will become apparent below.

In another embodiment, image data that corresponds to a single image, received through multiple DDI calls, is analyzed and merged or otherwise combined into a single image element. This single image element can then be processed, as by being serialized into XAML, so that it can be somewhat more efficiently consumed by a consuming device. Merging of the image data can eliminate noticeable seams, conserve parsing time and reduce memory consumption, as will become apparent below.

Exemplary System

Figure 1:
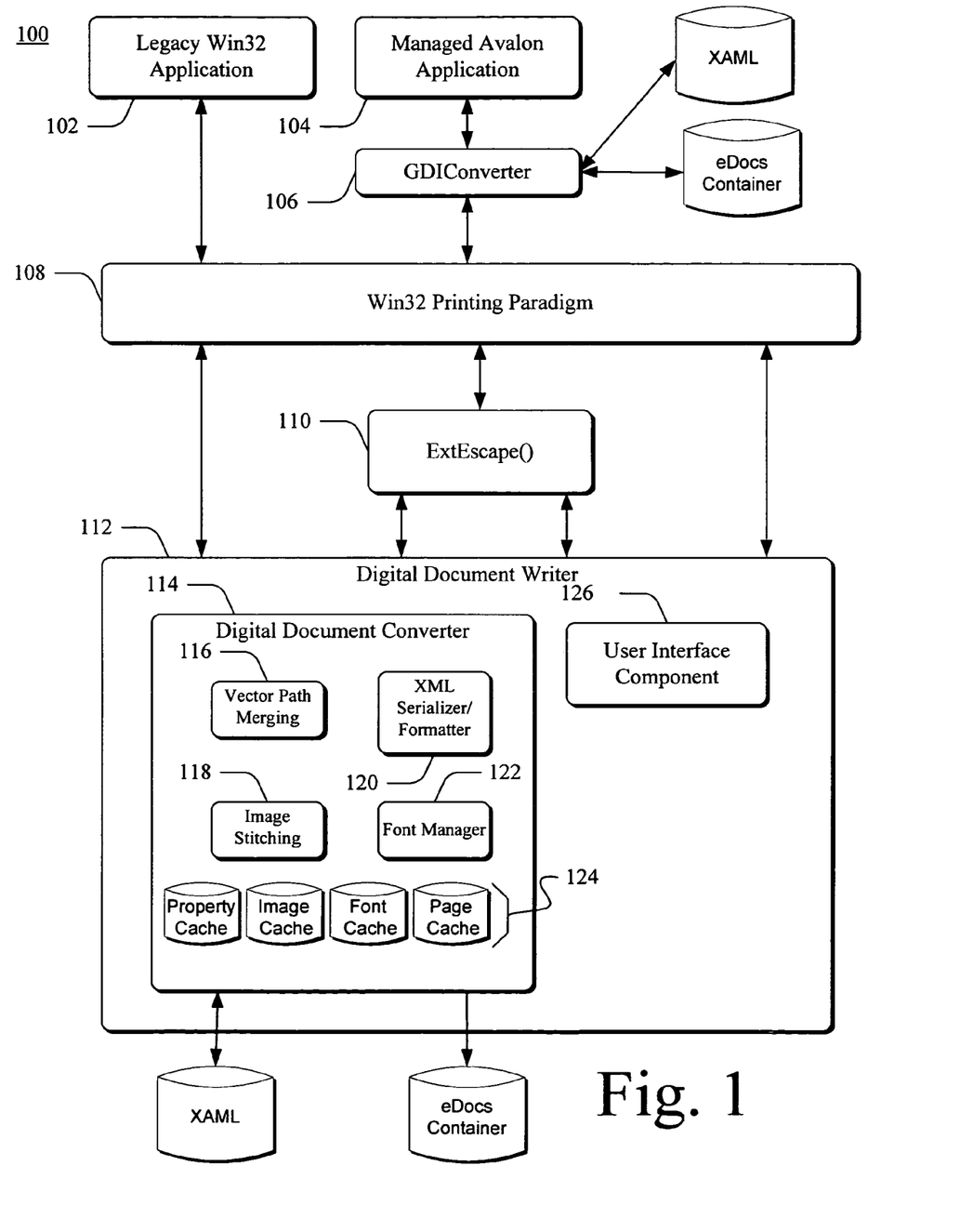
FIG. 1 is a block diagram of an exemplary system in accordance with one embodiment.

Consider the system shown in FIG. 1 generally at 100. Here, system 100 comprises a legacy application 102 (such as Word or PowerPoint), a managed Avalon application 104, a GDI converter 106, a Win32 Printing Paradigm 108, an ExtEscape function 110 and a Digital document writer 112.

Digital document writer 112 comprises, in this example, a digital document converter 114 which, in turn, comprises components that include a vector path merging component 116, an image stitching component 118, an XML serializer/formatter 120, a font manager 122 for managing and processing font data associated with a document and providing associated services such as font subsetting and text management services, and one or more caches 124. In this example, the caches include a property cache, an image cache, a font cache and a page cache. Document writer also includes a user interface component 126.

In the illustrated and described embodiment, the digital document writer 112 is configured to process documents or document data produced by an application and produce, in at least some embodiment, documents that can be delivered in containers. The containers contain modular components that describe the document and, where appropriate, the printing task. These components include the package or the container containing the document data and the common data for a specific print task, and the fixed payload, or the document described in a pre-paginated, fixed format. The actual document that is printed is considered as the payload of a container. A single container can contain more than one document payload.

In at least one embodiment, the document is fixed in the sense that its content has been formatted and positioned in a way that is application independent and reproducible on a wide range of devices. The payload is described using XAML (Extensible Application Markup Language)—which is an XML-based declarative programming language, to describe the document as a fixed-format payload in a document container. In the FIG. 1 illustration, these containers or XAML descriptions can be stored in a XAML store or an eDocs store, respectively.

For example, a book can be stored in a container. One book can contain several chapters and each chapter can contain several pages. The formatted pages for each chapter can be assembled into a single fixed payload. The payloads for each of the chapters can be assembled into a document package with the layout and other document features common to all the chapters contained in a common document component. The entire package can then exist in a container describing the entire book so that it can be displayed and printed as such.

Collecting the individual aspects of a document into a single container makes it easier to process and render a document because all of the necessary information is contained in a single logical unit.

In the system illustrated in FIG. 1, both the legacy application 102 and the Avalon application 104 can utilize the same software and algorithms to generate document containers or XAML-based representations of documents. In the case of the Avalon application 104, it communicates with the GDI converter 106 which effectively wraps the Avalon primitives into GDI-compatible primitives which are passed to the Win32 Printing Paradigm 108 using a Graphical Device Interface (GDI). This allows Avalon applications to use Binary GDI data such as an EMF-Enhanced Metafile or a WMF-Windows Metafile and convert them into Fixed Format Avalon primitives. These primitives can then be processed by the digital document writer 112 as described below to provide either "loose" XAML or a document container (as indicated by the data stores to the right of the Avalon application 104.

Consider now what happens when a user utilizes legacy application 102 to create a document. Assume, for example, that the user utilizes an application such as PowerPoint or Word to create a document and build graphics and images into the document. The user can now print the document to a suitable printer. Alternately, the user may wish to send the document to others in electronic form. Assume in this example that the user wishes to send the document in electronic form to others. In this case, the user interface component 126 causes a suitable dialog box to be presented to the user where, for example, the user can select a file name, a XAML container and its location, digital rights management and the like. When the user indicates that they are done, the application communicates to the Win32 printing paradigm 108 via a suitable call which calls the ExtEscape() function 110. This function enables applications to access capabilities of a particular device that are not available through GDI.

The ExtEscape function provides the file name and other appropriate data associated with the document to the digital document writer 112 which then stores the file name and creates a file on disk which set up various states that are going to be utilized in the processing that is described below. The digital document writer 112 then returns back to the Win32 printing paradigm 108 which, in turn, returns to application 102 and indicates to the application that it is ready to receive and process the application's data.

Application 102 then begins rendering text and images by calling appropriate Win32 calls that are embodied in the Win32 Printing Paradigm 108. In making its calls, the application sends data in the form of primitives that describe, for example, objects such as circles, lines, curves, colors and the like. GDI, embodied in the Win32 Printing Paradigm 108, receives those primitives, processes the primitives typically breaking the primitives into even smaller primitives, and makes a series of DDI calls, on the digital document converter 114, associated with smaller primitives that collectively comprise a larger primitive. The DDI calls typically contain text data, font data, image data, vector data and other metadata.

As the digital document converter 114 receives these DDI calls, it analyzes the calls and responsively caches specific call-related data into its respective cache (i.e. the property, image or font cache) on a per page and/or per document basis. Relevant data of each of the DDI calls is also cached in the page cache in the form of a tree structure or element tree that contains pointers or links to the respective property, image and font caches. Examples of such relevant data include such things as page width, page height, background color, image dimensions, glyph fill data, path data and the like.

At the end of each page generation from the DDI, the element tree in the page cache is analyzed for patterns that might present problematic visual anomalies if the page were to be rendered in its current state. If a problematic pattern is identified, individual elements in the element tree are set aside in a separate cache.

Once the element tree has been "walked" to identify problematic patterns and associated elements have been set aside, the individual elements in the element tree that gave rise to the problematic pattern are further processed and at least some of the elements are combined into a single element. The problematic elements are then deleted, the single element is inserted into the element tree, and the element tree can be further processed, as by being serialized into XAML or processed into an appropriate document container.

In the discussion that follows, two specific examples of how an element tree can be processed are provided to illustrate how the digital document converter 114 deals with two specific problems—that associated with vector path data, and that associated with image data.

Vector Path Merging into a Gradient Element

As DDI calls are received by digital document writer 112, the calls can contain vector path data and graphics, such as that which describes curves, circles, fills, fill colors, transparencies and the like. As these DDI calls are received, digital document converter 114 identifies the vector path data, creates a data structure in the form of the element tree referenced above (and contained in the page cache) that has path elements that correspond to the vector path data. Path elements on the element tree contain pointers to the appropriate data which is cached in the appropriate cache(s).

Figure 2:
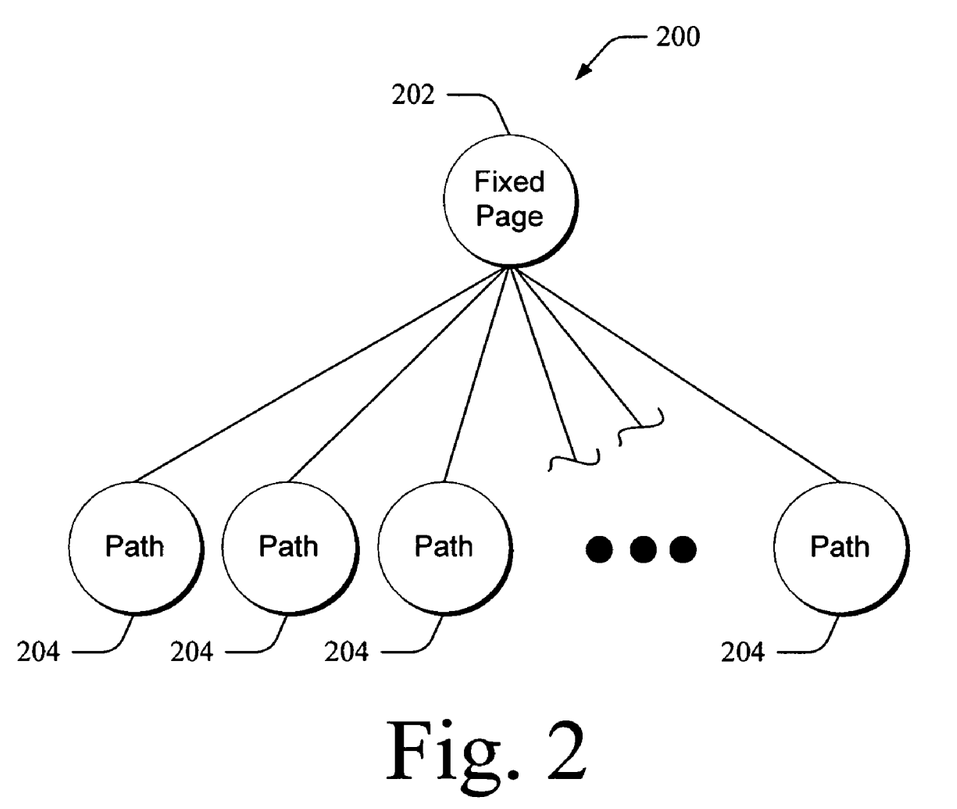
FIG. 2 is a diagram of an exemplary element tree in accordance with one embodiment.

As an example, consider FIG. 2 which illustrates an exemplary element tree 200 having a root node element "Fixed Page" 202 and various child "path" elements 204. These path elements are associated with the individual DDI calls that contained vector path data. In the illustrated and described embodiment, the element contains or points to binary data that represents the primitives that were received.

Once the element tree is built, vector path merging component 116 (FIG. 1) walks the tree looking for adjacent path elements. If there are no adjacent path elements, then the process continues until the end of the tree is reached. If, on the other hand, there are adjacent path elements, then the process examines various properties of the adjacent path elements to ascertain whether the elements are compatible. Examples of properties that are examined include bounding rectangles, path stroke, fill color and vertical alignment. If any of the properties of adjacent path elements are not compatible, then the process continues to search until the end of the tree—in this case the Fixed Page tree. If, on the other hand, the properties of the adjacent path elements indicate that the path elements are compatible, then each compatible element is set aside or saved in a linear list or cache, and the process of walking the element tree continues.

In the illustrated and described embodiment, path elements are compatible if their properties indicate, in accordance with defined heuristics, that they pertain to a gradient or a document color structure such as a solid color border that was broken down by GDI. For example, adjacent path elements can be compatible if their properties indicate that they do not overlap and contain the same color information. Incompatible path elements may, on the other hand, have properties that indicate that the path elements overlap. Alternately or additionally, path elements may be incompatible if, for example, the properties of one element indicate data associated with a circle or Bezier curve and the properties of the other path element indicate data that is not associated with a circle or Bezier curve, respectively. Further incompatibilities can be indicated by different transparencies, different shapes such as a rectangle and circle, shapes which do not adjoin or abut, strokes that are different, and the like.

Once the element tree has been walked to identify compatible path elements, if any compatible path elements were identified, then each adjacent path element is merged into a single gradient element. In the illustrated and described embodiment, adjacent path elements are merged by merging their associated vector path data and by creating, merging and copying other relevant elemental properties from the associated caches. In the illustrated and described embodiment, the gradient element comprises so-called stops that correspond to the color data of each path element. All redundant path elements (i.e. those that were combined) are discarded and the gradient element is inserted into the element tree.

Consider further how the path elements are merged in accordance with one embodiment. During the merging process, the vector merging component 116 looks at the properties of each separate path element and, for example, determines the extent or dimension associated with the path element. For example, the process may identify five adjacent path elements which, in turn, would lead to five stops in the gradient element. Each of the individual path elements, as ascertained from its property data, will have an associated dimension and a particular associated color. So, for example, the first path element may constitute 60% of the dimension associated with the gradient element, and the remaining four path elements may constitute 10% each of the gradient element dimension. In addition, each of these path elements has color information associated with it. This information is used by the vector path merging component 116 (FIG. 1) to define properties of the gradient element.

For example, assume that each of the separate path elements is associated with a rectangle and that a first of the rectangles is red, the last of the rectangles is green, and the rectangles therebetween define a stepwise gradation from red to green. Instead of having five different path elements each of which with its own properties that define the gradient, the single defined gradient element contains properties that define the gradient that was previously defined by five separate path elements.

Once adjacent path elements are merged, as indicated above, the gradient element is inserted into the element tree. The element tree can then be further processed. For example, in the system of FIG. 1, the element tree and its associated gradient element(s) can be transformed by the digital document converter 114 into an appropriate form, e.g. to contain an Avalon gradient element, and processed by an Avalon-based system for rendering. Alternately or additionally, the element tree can be serialized into XAML by the XML serializer/formatter component 120 (FIG. 1) and configured into an appropriate document container.

Figure 3:
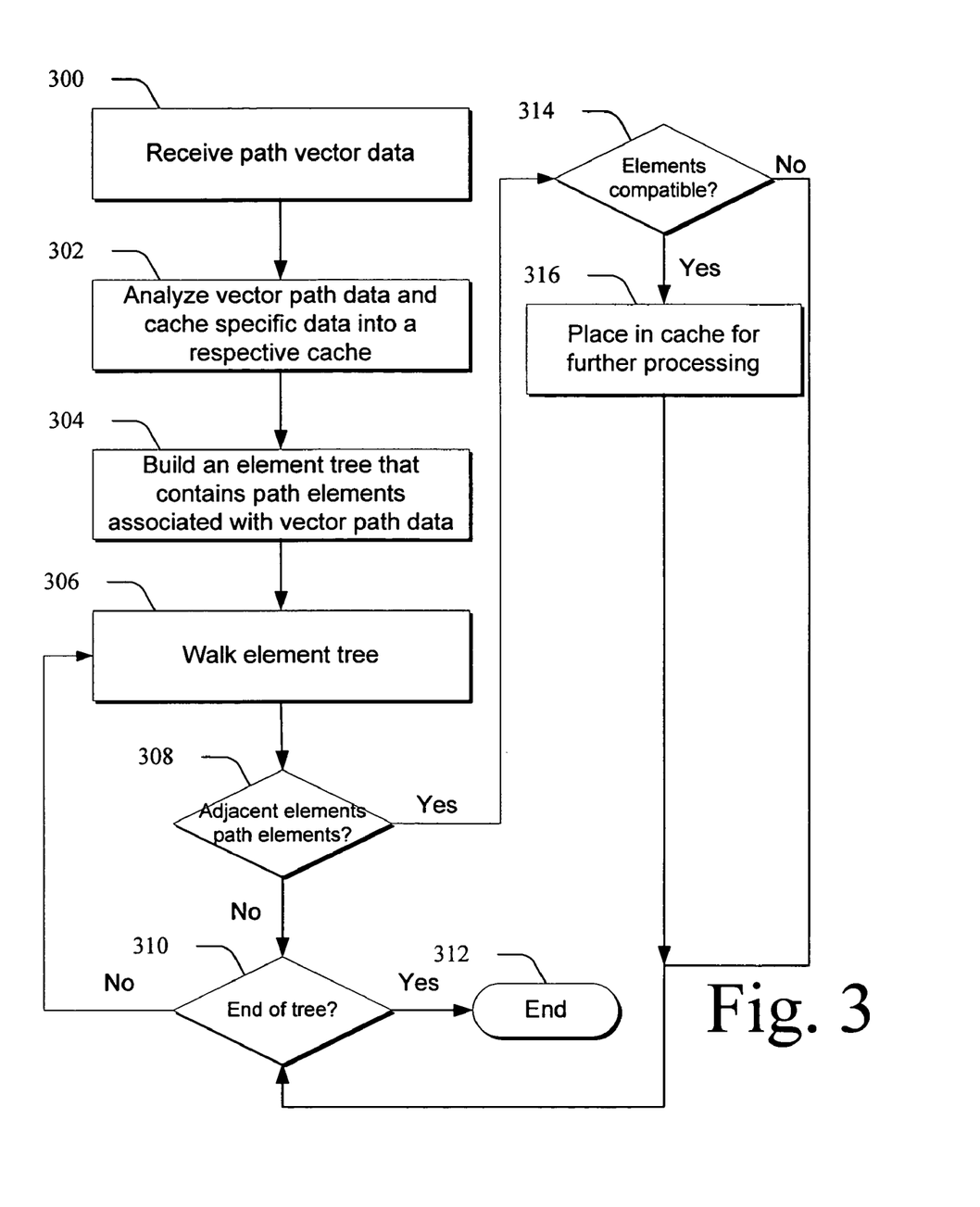
FIG. 3 is a flow diagram of a method in accordance with one embodiment.

FIG. 3 is a flow diagram that describes steps in a vector path merging method in accordance with one embodiment. The method can be implemented in any suitable hardware, software, firmware or combination thereof. In but one embodiment, the method can be implemented using a system such as the one shown in FIG. 1. Other systems can, however, be utilized without departing from the spirit and scope of the claimed subject matter.

Step 300 receives path vector data. Step 302 analyzes vector path data and caches specific data into a respective cache. In the example above, three caches are utilized—a property cache in which properties associated with the vector data are cached, an image cache in which images associated with the vector data are cached, and a font cache in which fonts associated with the vector data are cached. Step 304 builds an element tree that contains path elements associated with the vector path data. In the illustrated and described embodiment, the path elements are created and placed into the element tree responsive to the receiving the DDI calls, as discussed above. An example of an element tree is shown in FIG. 2.

Step 306 walks the element tree, element by element. Step 308 ascertains whether adjacent elements in the tree are path elements. If the adjacent elements are not path elements (i.e. the "no" branch), then for purposes of the vector path merging method, step 310 determines whether the method has reached the end of the tree. If not, the method returns to step 306. If the method has reached the end of the tree, the method ends.

If, on the other hand, step 308 ascertains that the adjacent elements in the element tree are path elements (i.e. the "yes" branch), then step 314 determines whether the path elements are compatible. Examples of how path elements can be compatible and incompatible are given above. If the path elements are not compatible, then the method branches to step 310. If, on the other hand, the path elements are determined to be compatible, then step 316 places the compatible elements in a cache for further processing and returns to step 310.

Once the entire element tree has been walked, the method accesses the cache into which the compatible elements were placed and further processes compatible elements to combine them into a single gradient element. As an example, consider FIG. 4. There, step 400 accesses the cache holding the compatible elements and step 402 examines properties associated with the compatible elements. Step 404 merges at least some of the compatible elements into a single gradient element. In at least one embodiment, all compatible elements are merged. It is to be appreciated and understood that the described process can create more than one gradient element.

Figure 4:
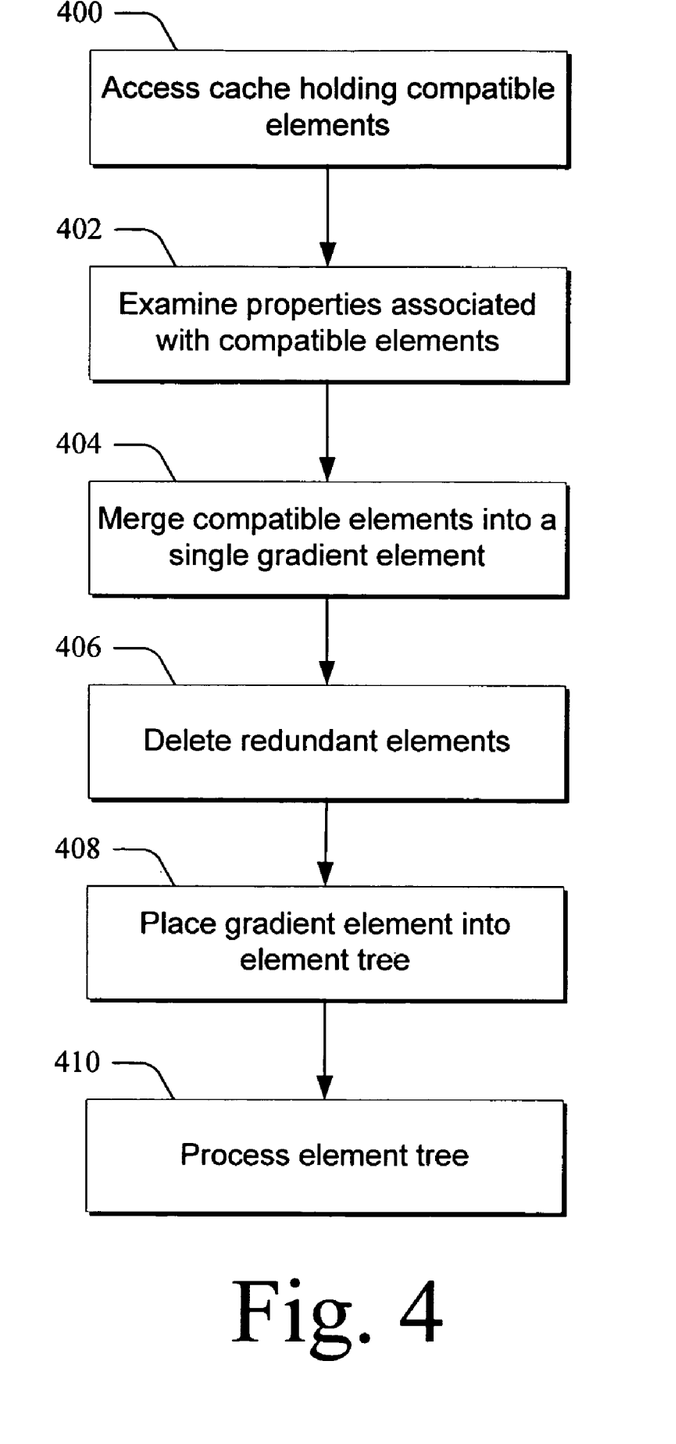
FIG. 4 is a flow diagram of a method in accordance with one embodiment.

Step 406 deletes redundant path elements (i.e. those path elements that have been merged into a single gradient element), and step 408 places the gradient element into the element tree and step 410 processes the element tree. Examples of how the element tree can be processed are given above.

Image Stitching

In the embodiment about to be described, image data that corresponds to a single image is received through multiple DDI calls. As the DDI calls are received, an element tree is built that contains image elements that correspond to the image data or image compatible data that is received through the DDI calls. Once the element tree is built, the tree is walked to identify adjacent image elements. If adjacent image elements are found, the image elements are analyzed to ascertain whether the image elements are compatible. If the elements are compatible, they are set aside in a cache and further processed to combine them into single image data or a single image element (e.g. a single XAML image element) which is inserted into the element tree. It is to be appreciated and understood that more than two image elements can be merged into a single image element. After the single image elements have been created and inserted into the element tree, the element tree can be further processed as described above, as by being serialized into XAML and the like.

Exploring the above process in more detail, as DDI calls are received by digital document writer 112 (FIG. 1), the calls can contain text data, font data, image data, vector data and other metadata. As these DDI calls are received, digital document converter 114 identifies the image data, creates a data structure in the form of the element tree referenced above (and contained in the page cache) that has image elements that correspond to the image data. Image elements on the element tree contain pointers to the appropriate data which is cached in the appropriate cache(s).

Figure 5:
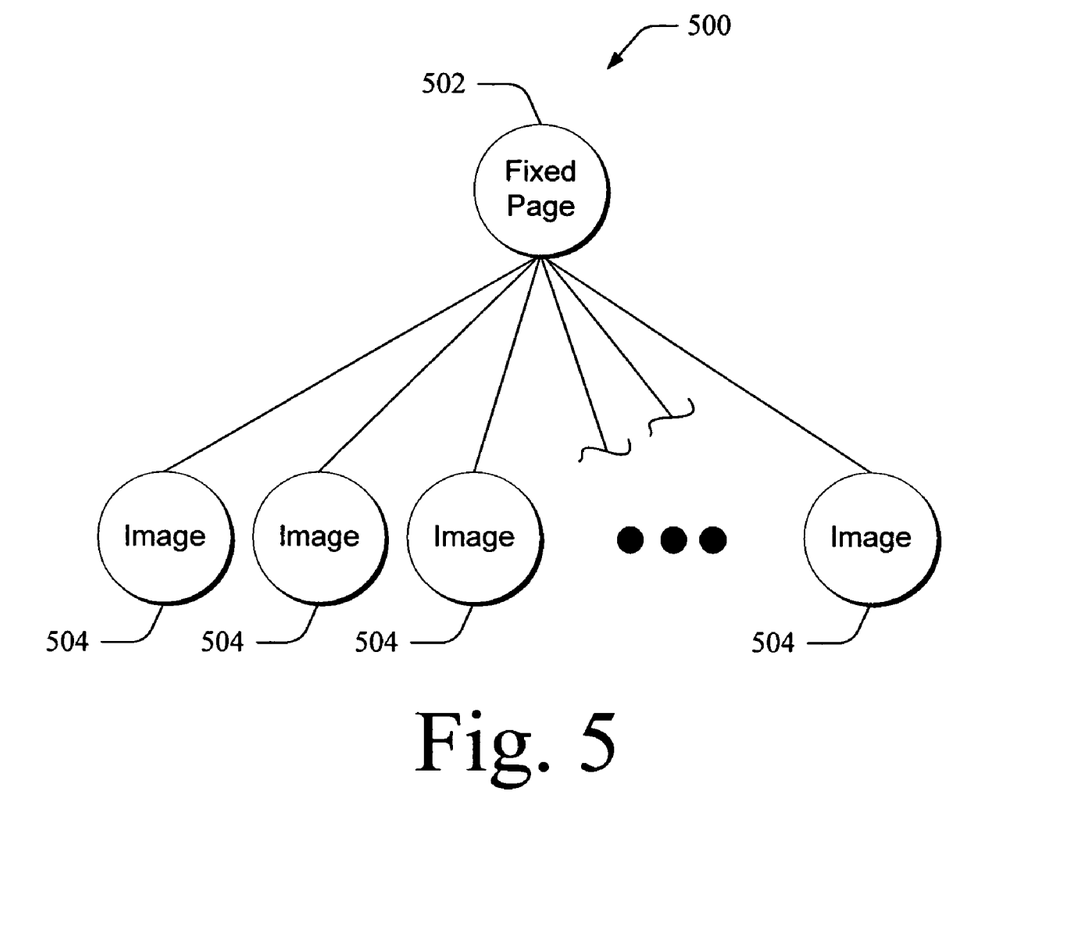
FIG. 5 is a diagram of an exemplary element tree in accordance with one embodiment.

As an example, consider FIG. 5 which illustrates an exemplary element tree 500 having a root node element "Fixed Page" 502 and various child "image" elements 504. These image elements are associated with the individual DDI calls that contained image data. In the illustrated and described embodiment, the element contains or points to binary data that represents the primitives that were received.

Once the element tree is built, image stitching component 118 (FIG. 1) walks the tree looking for adjacent image elements. If there are no adjacent image elements, then the process continues until the end of the tree is reached. If, on the other hand, there are adjacent image elements, then the process examines various properties of the adjacent image elements to ascertain whether the elements are compatible. Examples of properties that are examined include: DPI (dots per inch), mask, pattern, ROP4, transform, opacity, adjacent horizontal or adjacent vertical clipping rectangles, bit depth, and vertical or horizontal alignment. If any of the properties of adjacent image elements are not compatible, then the process continues to search until the end of the tree—in this case the Fixed Page tree. If, on the other hand, the properties of the adjacent image elements indicate that the image elements are compatible, then each compatible element is set aside or saved in a linear list or cache, and the process of walking the element tree continues.

In the illustrated and described embodiment, image elements can be compatible if their properties indicate, in accordance with defined heuristics, that they pertain to a single image that was broken down by GDI. For example, adjacent image elements can be compatible if their properties indicate that they are vertically or horizontally aligned and contain the same bit depth. Alternately, adjacent image elements that contain different bit depths may likely have come from different images. Hence, this would indicate an incompatibility.

Once the element tree has been walked to identify compatible image elements, if any compatible image elements were identified, then each adjacent image element is merged into a single image element. In one embodiment, the image data is merged to form a single larger image. In addition, multiple XAML image elements are also merged to form a single aggregate XAML image element. In the illustrated and described embodiment, adjacent image elements are merged by merging their associated image data and by creating, merging and copying other relevant elemental properties from the associated caches. All redundant image elements (i.e. those that were combined) are then discarded and the single image element is inserted into the element tree.

Once adjacent image elements are merged, as indicated above, the single image element is inserted into the element tree. The element tree can then be further processed. For example, in the system of FIG. 1, the element tree and its associated image element(s) can be transformed by the digital document converter 114 into an appropriate form, e.g. to contain an Avalon image element, and processed by an Avalon-based system for rendering. Part of this processing can include serializing the data in the managed ImageData object. Alternately or additionally, the element tree can be serialized into XAML by the XML serializer/formatter component 120 (FIG. 1) and configured into an appropriate document container.

Figure 6:
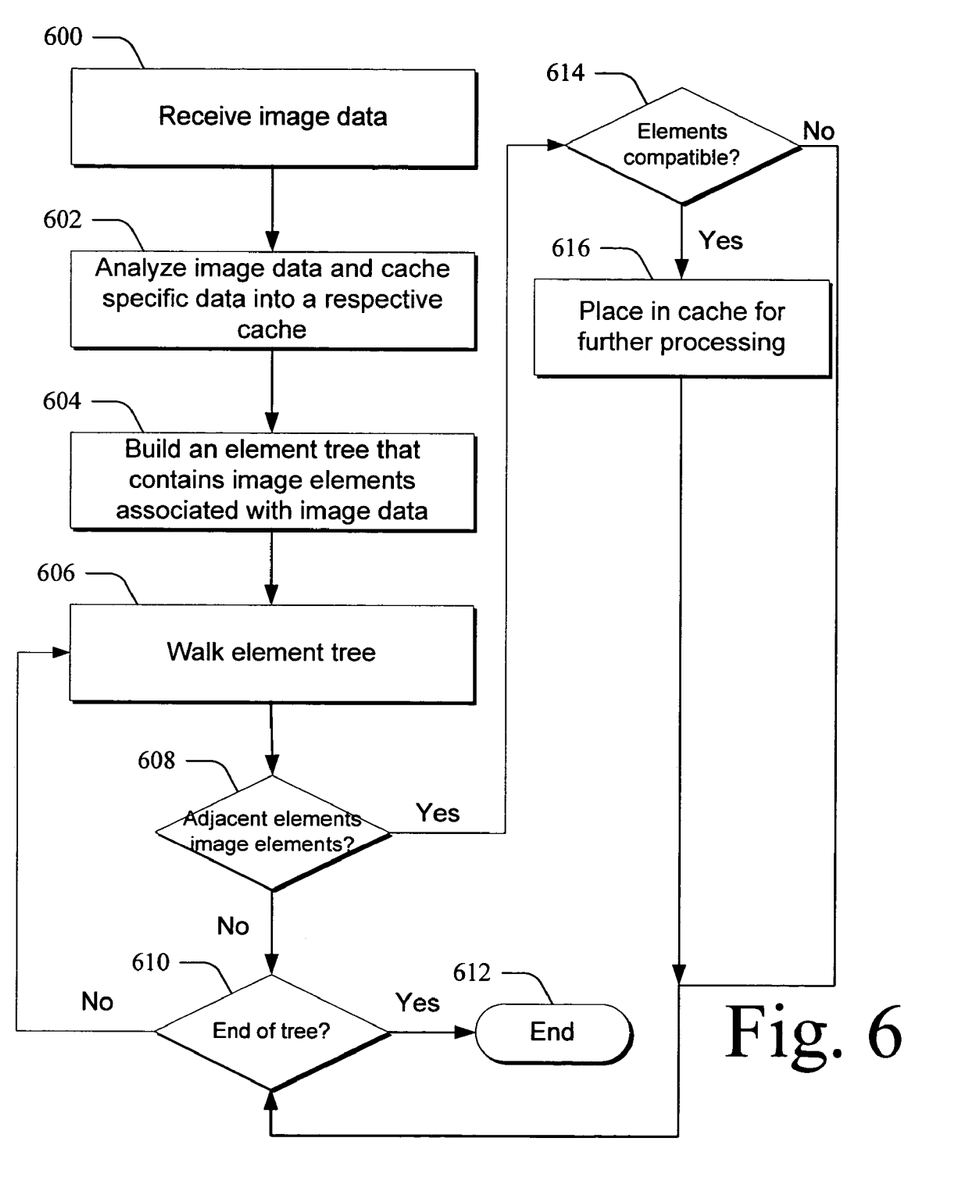
FIG. 6 is a flow diagram of a method in accordance with one embodiment.

FIG. 6 is a flow diagram that describes steps in an image stitching method in accordance with one embodiment. The method can be implemented in any suitable hardware, software, firmware or combination thereof. In but one embodiment, the method can be implemented using a system such as the one shown in FIG. 1. Other systems can, however, be utilized without departing from the spirit and scope of the claimed subject matter.

Step 600 receives image data that is generated by an application. Step 602 analyzes image data and caches specific data into a respective cache. In the example above, three caches are utilized—a property cache in which properties associated with the image data are cached, an image cache in which images associated with the image data are cached, and a font cache in which fonts associated with the image data are cached. Step 604 builds an element tree that contains image elements associated with the image data. In the illustrated and described embodiment, the image elements are created and placed into the element tree responsive to the receiving the DDI calls, as discussed above. An example of an element tree is shown in FIG. 5.

Step 606 walks the element tree, element by element. Step 608 ascertains whether adjacent elements in the tree are image elements. If the adjacent elements are not image elements (i.e. the "no" branch), then for purposes of the image stitching method, step 610 determines whether the method has reached the end of the tree. If not, the method returns to step 606. If the method has reached the end of the tree, the method ends.

If, on the other hand, step 608 ascertains that the adjacent elements in the element tree are image elements (i.e. the "yes" branch), then step 614 determines whether the image elements are compatible. Examples of how image elements can be compatible and incompatible are given above. If the image elements are not compatible, then the method branches to step 610. If, on the other hand, the image elements are determined to be compatible, then step 616 places the compatible elements in a cache for further processing and returns to step 610.

Once the entire element tree has been walked, the method accesses the cache into which the compatible elements were placed and further processes compatible elements to combine them into a single image element. As an example, consider FIG. 7. There, step 700 accesses the cache holding the compatible elements and step 702 examines properties associated with the compatible elements. Step 704 merges at least some of the compatible elements into a single image element. In at least one embodiment, all of the compatible image elements are merged. It is to be appreciated and understood that the described process can create more than one image element.

Figure 7:
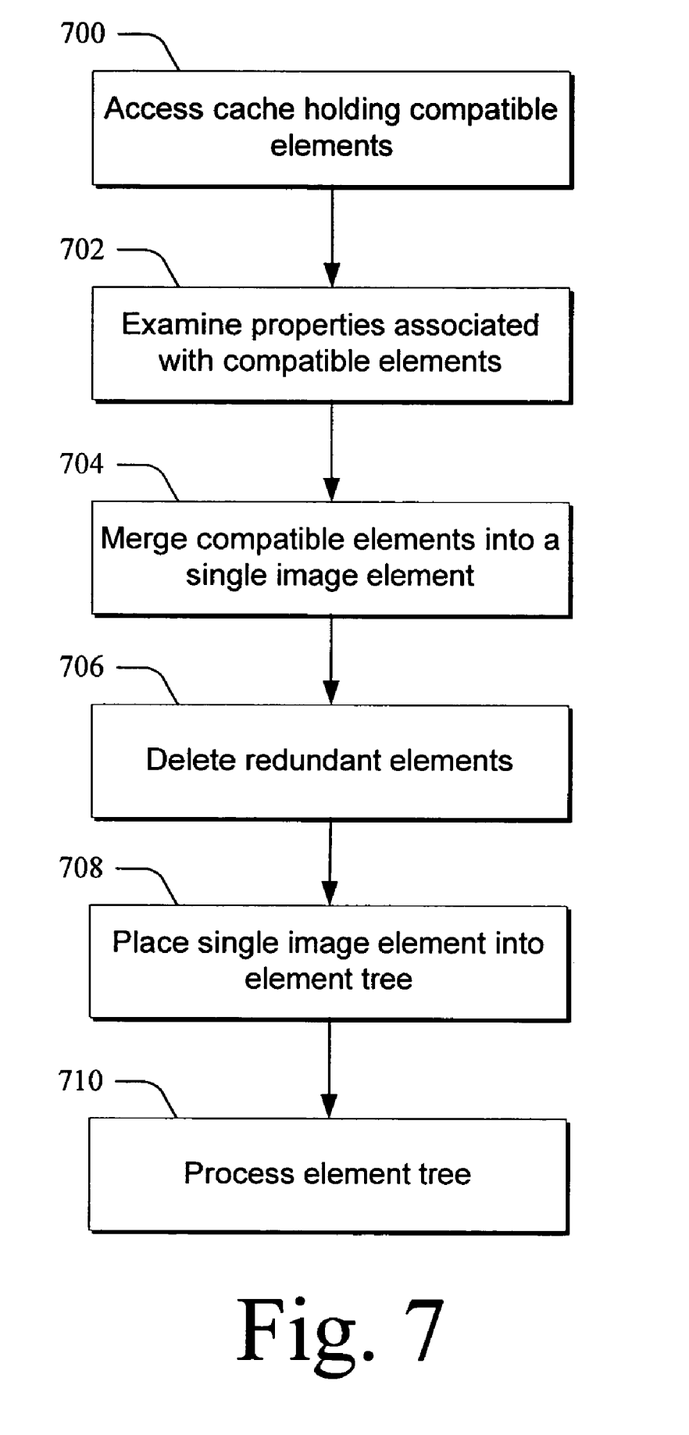
FIG. 7 is a flow diagram of a method in accordance with one embodiment.

Step 706 deletes redundant image elements (i.e. those image elements that have been merged into a single image element), and step 708 places the image element into the element tree and step 710 processes the element tree. Examples of how the element tree can be processed are given above.

Exemplary Computer System

Figure 8:
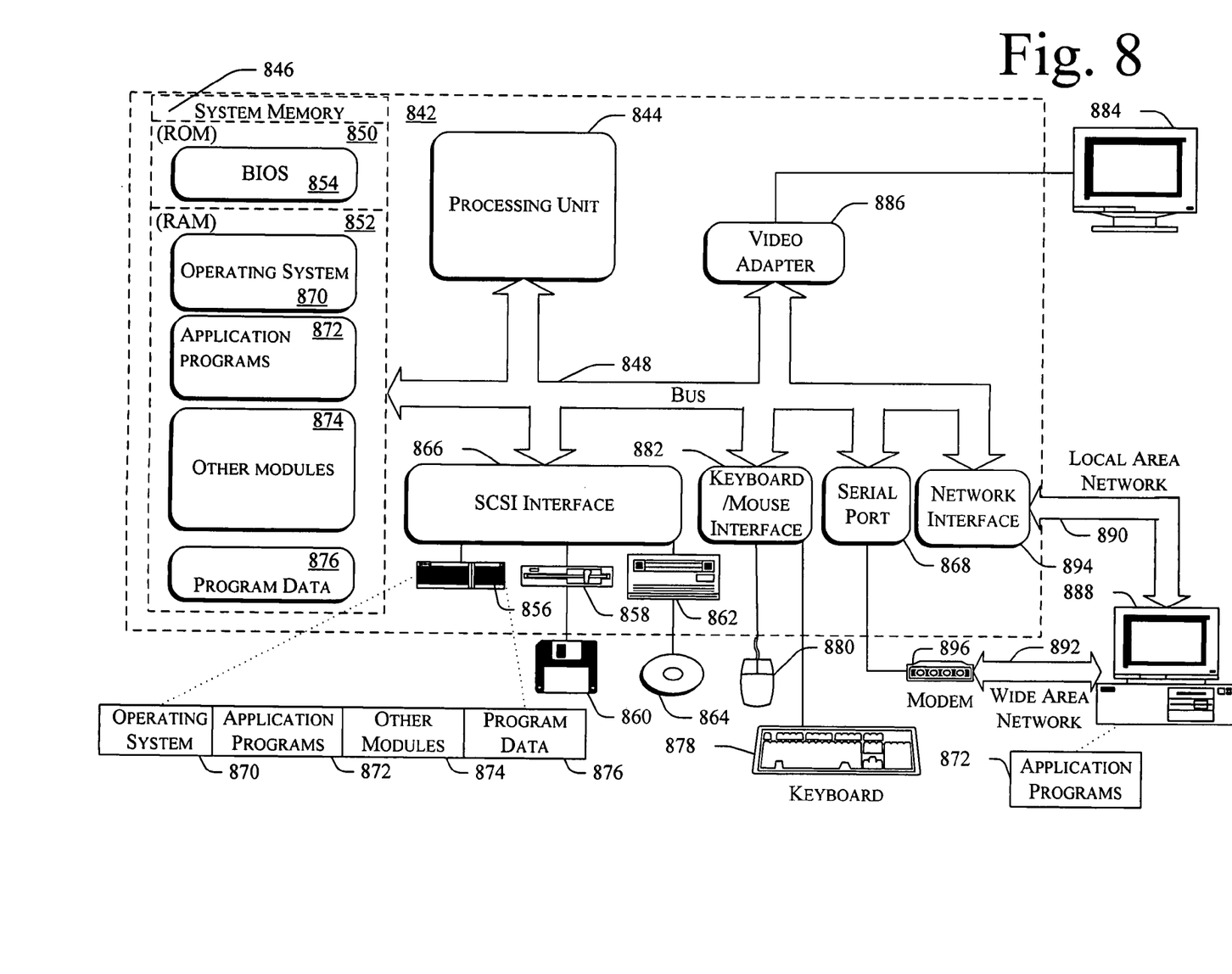
FIG. 8 is a block diagram of an exemplary computing device in accordance with one embodiment.

FIG. 8 shows an exemplary computing device that can be used to implement the processes described above. Computing device 842 comprises one or more processors or processing units 844, a system memory 846, and a bus 848 that couples various system components including the system memory 846 to processors 844. The bus 848 represents one or more of any of several types of bus structures, including a memory bus or memory controller, a peripheral bus, an accelerated graphics port, and a processor or local bus using any of a variety of bus architectures. The system memory 846 comprises read only memory (ROM) 850 and random access memory (RAM) 852. A basic input/output system (BIOS) 854, containing the basic routines that help to transfer information between elements within computing device 842, such as during start-up, is stored in ROM 850.

Computing device 842 can further comprise a hard disk drive 856 for reading from and writing to a hard disk (not shown), a magnetic disk drive 858 for reading from and writing to a removable magnetic disk 860, and an optical disk drive 862 for reading from or writing to a removable optical disk 864 such as a CD ROM or other optical media. The hard disk drive 856, magnetic disk drive 858, and optical disk drive 862 are connected to the bus 848 by an SCSI interface 866 or some other appropriate interface. The drives and their associated computer-readable media provide nonvolatile storage of computer-readable instructions, data structures, program modules and other data for computer 842. Although the exemplary environment described herein employs a hard disk, a removable magnetic disk 860 and a removable optical disk 864, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 856, magnetic disk 860, optical disk 864, ROM 850, or RAM 852, including an operating system 870, one or more application programs 872 (such as a user agent or browser), other program modules 874, and program data 876. A user may enter commands and information into computer 842 through input devices such as a keyboard 878 and a pointing device 880. Other input devices (not shown) may comprise a microphone, joystick, game pad, satellite dish, scanner, or the like. These and other input devices are connected to the processing unit 844 through an interface 882 that is coupled to the bus 848. A monitor 884 or other type of display device is also connected to the bus 848 via an interface, such as a video adapter 886. In addition to the monitor, personal computers typically comprise other peripheral output devices (not shown) such as speakers and printers.

Computer 842 commonly operates in a networked environment using logical connections to one or more remote computers, such as a remote computer 888. The remote computer 888 may be another personal computer, a server, a router, a network PC, a peer device or other common network node, and typically comprises many or all of the elements described above relative to computer 842. The logical connections depicted in FIG. 8 comprise a local area network (LAN) 890 and a wide area network (WAN) 892. Such networking environments are commonplace in offices, enterprise-wide computer networks, intranets, and the Internet.

When used in a LAN networking environment, computer 842 is connected to the local network through a network interface or adapter 894. When used in a WAN networking environment, computer 842 typically comprises a modem 896 or other means for establishing communications over the wide area network 892, such as the Internet. The modem 896, which may be internal or external, is connected to the bus 848 via a serial port interface 868. In a networked environment, program modules depicted relative to the personal computer 842, or portions thereof, may be stored in the remote memory storage device. It will be appreciated that the network connections shown are exemplary and other means of establishing a communications link between the computers may be used.

Generally, the data processors of computer 842 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein comprises these and other various types of computer-readable storage media when such media contain instructions or programs for implementing the blocks described, in conjunction with a microprocessor or other data processor. The system described can also comprise the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The methods and systems described above can reduce noticeable visual anomalies, such as seams and bands, by merging multiple elements into a single element that embodies properties of the merged elements. In addition, by reducing the number of elements in an element tree that represents portions of a user's document, parsing time associated with parsing and processing the tree is more efficiently utilized. In addition, memory consumption can be reduced which, in turn, adds efficiencies to the processing system.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
 a memory;
 software code embodied on one or more computer-readable media which, when executed, provides an architecture comprising:
  a digital document converter comprising at least a vector path merging component, wherein the digital document converter and the vector path merging component are collectively configured to:
  receive vector path data from an application;
  process the vector path data to build an element tree comprising path elements that correspond to the vector path data responsive to receiving device driver interface (DDI) calls, and for individual DDI calls:
   analyzing the DDI calls;
   caching call-related vector path data into a respective cache; and
   building said element tree to include elements that contain pointers or links to a respective cache;
  process the element tree to identify adjacent compatible path elements; and
  merge at least some adjacent compatible path elements into a single gradient element.

2. The system of claim 1, wherein the vector path merging component ascertains whether adjacent path elements are compatible by examining properties associated with the adjacent path elements.

3. The system of claim 1, wherein the vector path merging component ascertains whether adjacent path elements are compatible by examining properties associated with the adjacent path elements, wherein the properties comprise one or more of: bounding rectangles, path stroke, fill color or vertical alignment.

4. The system of claim 1, wherein the digital document converter comprises an XML serializer component for serializing a binary representation of the element tree into an XML-based representation.

5. The system of claim 1, wherein the digital document converter comprises an XML serializer component for serializing a binary representation of the element tree into an XML-based representation, and further wherein the digital document converter is configured to produce a container containing modular components that describe a document associated with the element tree.

6. The system of claim 1, wherein the digital document converter is configured to responsively cache call-related data in one or more of a property cache, image cache or font cache.

7. Wherein the digital document converter is configured to build the element tree in a page cache, and wherein the element tree comprises pointers into one or more of the property cache, image cache or font cache.

8. The system of claim 1, wherein the vector path merging component identifies compatible path elements by looking for patterns that would result in a visually-discernible anomaly if the path elements were to be rendered.

9. A computing device embodying the system of claim 1, wherein the computing device further comprises a processor facilitating execution of the software code embodied on the computer-readable media.

10. A method comprising:
 receiving vector path data;
 building an element tree that contains path elements associated with the vector path data responsive to receiving multiple device driver interface (DDI calls, and for individual DDI calls:
  analyzing the DDI calls;
  caching call-related vector path data into a respective cache; and
  building said element tree to include elements that contain pointers or links to a respective cache;
 identifying adjacent compatible vector path elements; and merging at least some adjacent compatible vector path elements into a single gradient element.

11. The method of claim 10 further comprising, responsive to receiving the vector path data, caching properties associated with the vector path data in a property cache.

12. The method of claim 10, wherein the act of identifying comprises:
walking the element tree and identifying adjacent path elements; and
ascertaining, from properties associated with the adjacent path elements, whether the path elements are compatible.

13. The method of claim 10, wherein the act of identifying comprises:
walking the element tree and identifying adjacent path elements; and
ascertaining, from properties associated with the adjacent path elements, whether the path elements are compatible, wherein the properties comprise one or more of: bounding rectangles, path stroke, fill color or vertical alignment.

14. The method of claim 10, wherein the gradient element comprises stops that correspond to color data of each of the merged path elements.

15. The method of claim 10 further comprising inserting the gradient element into the element tree.

16. The method of claim 10 further comprising inserting the gradient element into the element tree and serializing the element tree into an XML-based representation.

17. The method of claim 10 further comprising inserting the gradient element into the element tree, serializing the element tree into an XML-based representation and producing a container containing modular components that describe a document associated with the element tree.

18. The method of claim 10, wherein said acts of receiving, building, identifying and merging are performed by a digital document converter component.

19. One or more computer-readable media having computer-readable instructions thereon which, when executed, implement the method of claim 10.

20. A computing device comprising:
the one or more computer-readable media of claim 19; and
a processor facilitating execution of the computer-readable instructions embodied on the computer-readable media.

21. A system comprising:
one or more processors;
one or more computer-readable media;
computer-readable instructions on the one or more computer-readable media which, when executed by the one or more processors, cause the one or more processors to implement a method comprising:
receiving vector path data;
building an element tree that contains path elements associated with the vector path data responsive to receiving device driver interface (DDI) calls, and for individual DDI calls:
analyzing the DDI calls;
caching call-related vector path data into a respective cache; and
building the element free to include elements that contain pointers or links to a respective cache;
identifying adjacent compatible vector path elements by walking the element tree, identifying adjacent path elements, and ascertaining, from properties associated with the adjacent path elements, whether the path elements are compatible; and
merging at least some adjacent compatible vector path elements into a single gradient element.

22. The system of claim 21, wherein the method further comprises, responsive to receiving the vector path data, caching properties associated with the vector path data in a property cache.

23. The system of claim 21, wherein the properties comprise one or more of: bounding rectangles, path stroke, flu color or vertical alignment.

24. The system of claim 21, wherein the gradient element comprises stops that correspond to color data of each of the merged path elements.

25. The system of claim 21, wherein the method further comprises inserting the gradient element into the element tree.

26. The system of claim 21, wherein the method further comprises inserting the gradient element into the element tree and serializing the element tree into an XML-based representation.

27. The system of claim 21, wherein the method further comprises inserting the gradient element into the element tree, serializing the element tree into an XML-based representation and producing a container containing modular components that describe a document associated with the element tree.

28. A system comprising:
means for processing data;
means for receiving vector path data;
means for building an element tree that contains path elements associated with the vector path data responsive to receiving multiple device driver interface (DDI) calls, and for individual DDI calls:
analyzing the DDI calls;
caching call-related vector path data into a respective cache; and
building said element tree to include elements that contain pointers or links to a respective cache;
means for identifying adjacent compatible vector path elements; and
means for merging at least some adjacent compatible vector path elements into a single gradient element.

29. The system of claim 28 further comprising means for caching properties associated with the vector path data in a property cache.

30. The system of claim 28, wherein the means for identifying comprises:
means for walking the element tree and identifying adjacent path elements; and
means for ascertaining, from properties associated with the adjacent path elements, whether the path elements are compatible.

31. The system of claim 28, wherein the means for identifying comprises:
means for walking the element tree and identifying adjacent path elements; and
means for ascertaining, from properties associated with the adjacent path elements, whether the path elements are compatible, wherein the properties comprise one or more of: bounding rectangles, path stroke, fill color or vertical alignment.

32. The system of claim 28, wherein the gradient element comprises stops that correspond to color data of each of the merged path elements.

33. The system of claim 28 further comprising means for inserting the gradient element into the element tree.

34. The system of claim 28 further comprising means for inserting the gradient element into the element tree and means for serializing the element tree into an XML-based representation.

35. The system of claim 28 further comprising means for inserting the gradient element into the element tree and means for serializing the element tree into an XML-based representation and means for producing a container containing modular components that describe a document associated with the element tree.

36. The system of claim 28, wherein said means for receiving, means for building, means for identifying and means for merging comprise a digital document converter component embodied on a computer-readable medium.

* * * * *